United States Patent [19]

Oka et al.

[11] Patent Number: 5,377,013
[45] Date of Patent: Dec. 27, 1994

[54] METHOD OF SIMULATING COLOR IMAGES

[75] Inventors: Kenichiro Oka; Masaru Onishi, both of Kamakura, Japan

[73] Assignee: Mitsubishi Denki Kabushiki Kaisha, Tokyo, Japan

[21] Appl. No.: 929,344

[22] Filed: Aug. 12, 1992

[30] Foreign Application Priority Data

Aug. 16, 1991 [JP] Japan .................. 3-205984

[51] Int. Cl.$^5$ ..................... H04N 9/79; G03F 3/08
[52] U.S. Cl. ..................... 358/332; 358/501; 358/518; 358/523; 358/530
[58] Field of Search ..................... 358/310–311, 358/316, 332, 500, 501, 504, 518–527, 530, 531

[56] References Cited

U.S. PATENT DOCUMENTS

| | | | |
|---|---|---|---|
| 4,684,979 | 8/1987 | Hikosawa | 358/75 |
| 4,837,710 | 6/1989 | Zelinsky et al. | 364/521 |
| 4,864,391 | 9/1989 | Taguchi | 358/80 |
| 4,935,809 | 6/1990 | Hatashi et al. | 358/76 |
| 4,962,421 | 10/1990 | Murai | 358/76 |
| 4,979,031 | 12/1990 | Tuboi et al. | 358/75 |
| 5,018,085 | 5/1991 | Smith, Jr. | 358/80 |
| 5,231,506 | 7/1993 | Manico et al. | 358/302 |

FOREIGN PATENT DOCUMENTS

| | | |
|---|---|---|
| 62-161308 | 2/1987 | Japan . |
| 62-144280 | 8/1987 | Japan . |
| 2-110532 | 5/1990 | Japan . |

Primary Examiner—Vit W. Miska
Attorney, Agent, or Firm—Wolf, Greenfield & Sacks

[57] ABSTRACT

A method of simulating a color image. Firstly, images are displayed and printed, respectively, by means of display device and hard copy unit on the basis of the same image data. Secondly, the image data are subjected to a color conversion process by the use of color conversion parameters having different values from one another, and a plurality of processed images are displayed by the display device. Moreover, from among the processed images being currently displayed there is selected a processed image having substantially the same colors as the image recorded by the hard copy unit, to thereby set the value of the color conversion parameter. Subsequently, a color conversion parameter representing an inverse conversion to the color conversion by way of color conversion parameter which has been set is set into the hard copy unit to thereby print the image based on said image data.

9 Claims, 4 Drawing Sheets

METHOD OF SIMULATING COLOR IMAGES

BACKGROUND OF THE INVENTION

1. Field of the Invention

The present invention relates to a method of simulating color images which is to be executed on a screen of a display device such as a cathode ray tube (CRT) to obtain a desirably colored image when printing the image by means of a hard copy unit.

2. Description of the Related Arts

Recent hard copy units such as a printer, a copying machine or the like are equipped with a variety of color conversion functions. In some of the hard copy units provided with the color conversion functions, the degree of a color conversion processing is adjusted through tile provision of color conversion parameters. FIG. 4 illustrates a construction of a color printer in which the degree of the color conversion processing is adjustable by virtue of the color conversion parameters and which is typically disclosed in Japanese Patent Laid-open Publication No. 2-270575.

The color printer shown in this drawing comprises a console panel 2, a color control section 3, a print control section 6 and output section 7. The color control section 3 acts to determine a coloration at the time of printing based on color conversion parameters which are down loaded from a host computer 1 as well as color conversion parameters which are manually input through a switch 2A constituting the console panel 2. The print control section 6 controls the output section 7 so that an image can be printed in compliance with the determined coloration. The output section 7 prints under the control of tile print control section 6 the image represented by image data to be supplied from a circuit not shown.

The color control section 3 includes a data analyzing section 4 and a data editing section 5. Through the action of the data analyzing section 4 and the data editing section 5, different coloration can be selected in response to the state of the switch 2A.

Firstly, in case the color conversion parameters which have been down loaded from the host computer 1 are coincident with the color conversion parameters which have been manually input through the switch 2A, the data analyzing section 4 determines the coloration depending on the color conversion parameters down loaded from the host computer 1. In other words, the color conversion parameters down loaded from the host computer 1 are supplied into the print control section 6.

Secondly, also in the case where no color conversion parameters are manually input by way of the switch 2A, the data analyzing section 4 determines a coloration on the basis of the color conversion parameters down loaded from the host computer 1.

Moreover, providing that the color conversion parameters down loaded from the host computer 1 are not coincident with the color conversion parameters manually input through the switch 2A, the data analyzing section 4 transfers both the color conversion parameters into the data editing section 5.

The data editing section 5 determines the coloration with a priority conferred upon the color conversion parameters manually input by means of the switch 2A, and supplies the color conversion parameters associated with the obtained coloration into the print control section 6.

In this manner, the user of the conventional apparatus can attain a record image of a necessary color. In other words, the color conversion functions are capable of being adjusted by down loading the color conversion parameter into the color control section 3 from the host computer 1 or by operating the console panel 2.

However, it is unclear what color of printed or hard copied image can be obtained until the image is printed on trial. It is commonly difficult to obtain a desirably colored record image through only one printing, and it is necessary to repeatedly output the print images or to carry out a cut and try. This is a waste of ink and recording paper.

Alternatively, it is also conceivable to perform a recording after the confirmation of the image color by way of the display device such as the CRT. Unfortunately, the image color appearing on the display device such as the CRT is different from the image color obtained by the hard copy unit such as the printer, since the former is represented in additive primaries consisting of R (red), G (green), and B (blue), whereas the latter is represented in subtractive primaries consisting of Y (yellow), M (magenta), and C (cyan). Namely, the display device differs from the hard copy unit in the manner of representing colors and hence in the range of the color representation. As a result, there still remains a necessity for the cut and try irrespective of the confirmation by means of the display device such as the CRT.

SUMMARY OF THE INVENTION

It Is the object of the present invention to eliminate the necessity for a cut and try at the time of recording by a hard copy unit, to thereby lessen consumption of ink or recording paper.

in order to achieve the above object, the present applicant proposes a method of simulating color images comprising the following steps.

a) displaying and recording images by means of a display device and a hard copy unit, respectively, based on the same image data;

b) subjecting said image data to a color conversion process by means of color conversion parameters having different values from one another, to display a plurality of processed images by way of said display device;

c) settling values of said color conversion parameters in response to selecting a processed image having substantially the same color as that of the image recorded by said hard copy unit from among said processed images being currently displayed; and d) setting in said hard copy unit a color conversion parameter representing an inverse conversion to the color conversion by way of said color conversion parameter which has been set, to thereby record an image based on said image data.

The adoption of such simulation method requires only one image recording before obtaining an object image, which leads to a saving of ink or paper.

Moreover, the present applicant proposes a color image printing apparatus having the following construction and serving as an environment for practicing this method.

a) a means for inputting image data representing an original image;

b) a means for causing a display device to display an original image in accordance with said image data to be input;

c) a means for causing a hard copy unit to record said original image in accordance with said image data;

d) a means for subjecting said image data to color conversions by way of color conversion parameters each having a different value, to thereby allow said display device to display them in the form of processed images having different colors from one another;

e) a means for selecting any one from among said processed images being displayed by said display device; and f) a means for causing said hard copy unit to record said original image in such a manner that said original image is subjected to an inverse color conversion to the color conversion which said selected processed image undergoes.

The above apparatus ensures an preferred execution of the method in accordance with the present invention. For an easier view of the display device screen, preferably the original image and the processed images may be displayed side by side, or a plurality of processed images having different color conversion parameter values from one another may be displayed in rows, or the processed image which has been selected by the selection means may be emphatically displayed by the display device.

Furthermore, in the case of presence of a plurality of color conversion parameters, the value associated with the processed image is selected one after another with respect to all the color conversion parameters, to consequently improve the usability. In this case, the color conversion parameters of the processed image being currently selected is preferably displayed while the color conversion parameter being currently processed by the selection means is emphatically displayed for an easier view of the screen.

DESCRIPTION OF THE PREFERRED EMBODIMENTS

Figure 4:
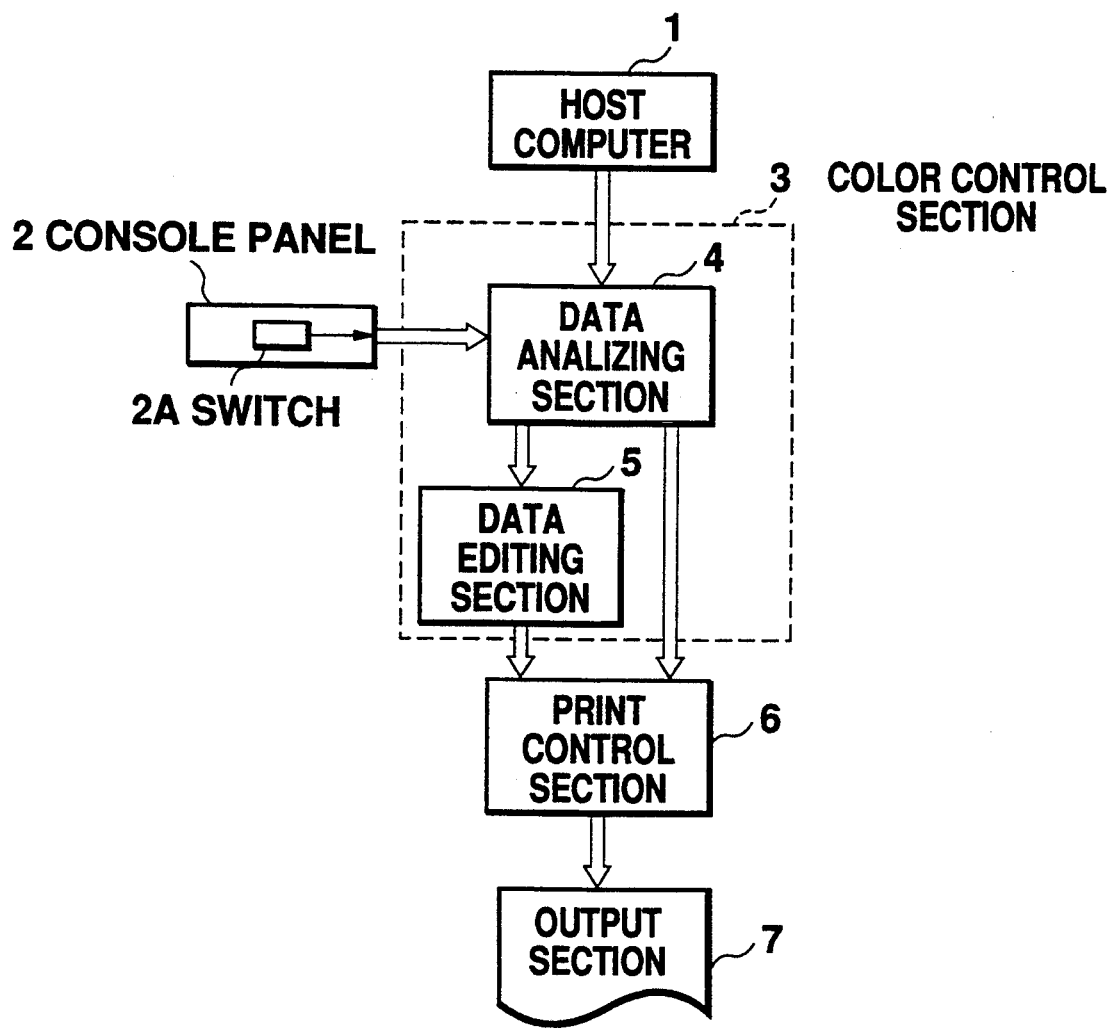
FIG. 4 shows a construction of the color printer in accordance with a conventional example.

A presently preferred embodiment of the present invention will now be described with reference to the accompanying drawings. Equivalents shown in the conventional example in FIG. 4 are denoted by the same reference numerals, and not repeatedly described in detail hereinafter.

Figure 1:
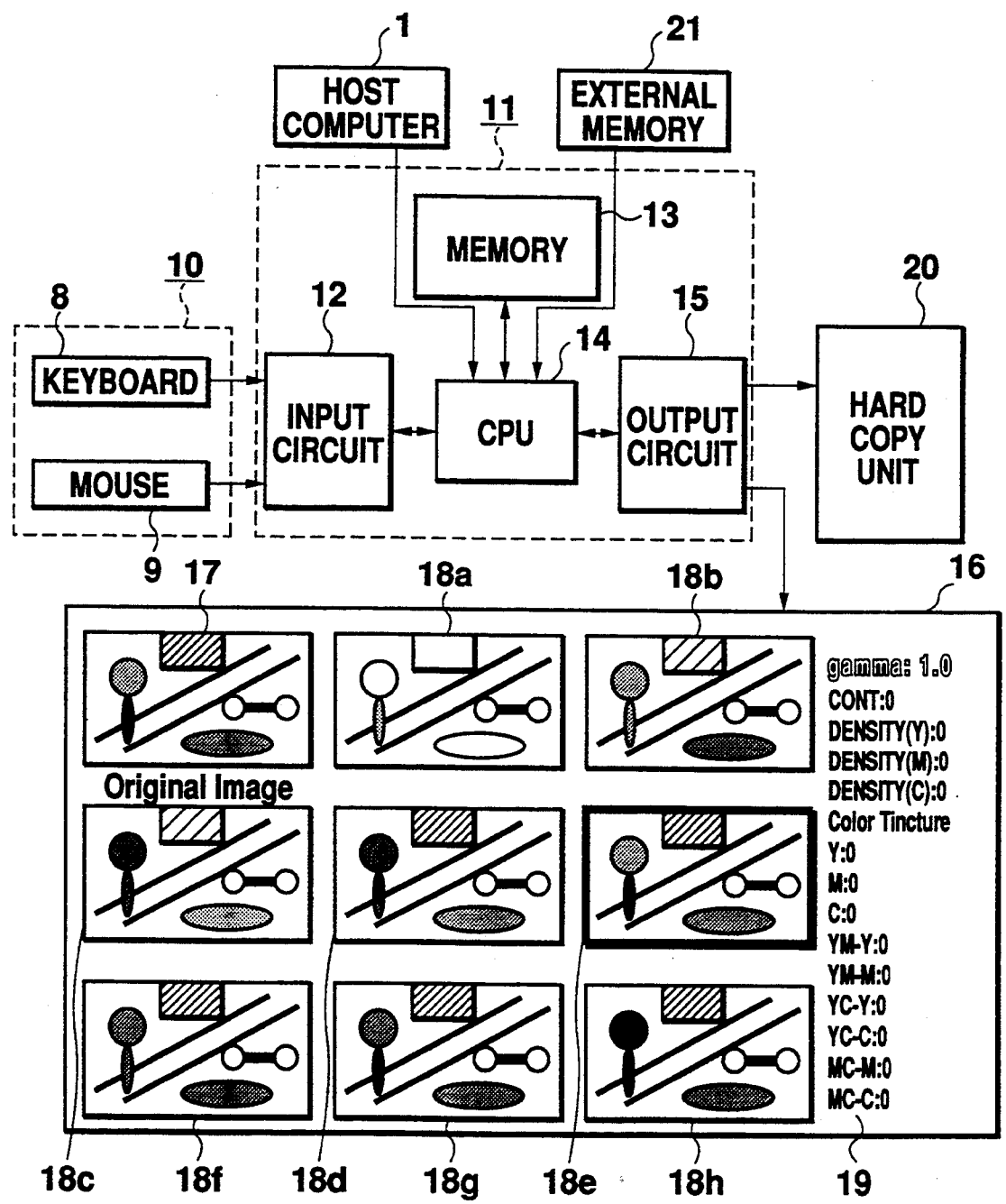
FIG. 1 is a block diagram illustrating a construction of the color image printing apparatus in accordance with an embodiment of the present invention.

FIG. 1 illustrates, by way of example, a configuration of a color image printing apparatus which is an environment for practicing the present invention. The apparatus comprising an input section 10, a control section 11, and a display device 16 and a hard copy unit 20 is connected to a host computer 1 and an external memory 21.

The input section 10 includes a keyboard 8 and a mouse 9, or may include further additional input device. The input section 10 is also used for, e.g., the selection of a color conversion function, the input of color conversion parameters, the selection of an image to be processed.

The control section 11 includes an input circuit 12, a memory 13, a CPU 14, and an output circuit 15. The input circuit 12 serves as an input interface intervening between the input section 10 and the CPU 14, while the output circuit 15 serves as an output interface intervening between the CPU 14 and the display device 16, and between the CPU 14 and the hard copy unit 20. The memory 13 stores a simulation program and/or original image data. The function of the CPU will be detailed later.

The display device 16 displays an original image 17, processed images 18a to 18h, and color conversion parameters 19. In the case of this drawing, the original image 17 and the processed images 18a to 18h are displayed in 3×3 array, while the color conversion parameters 19 are displayed on the right in the drawing. The color conversion parameters 19 consists of fourteen kinds of parameters (gamma; CONT; DENSITY (Y); DENSITY (M); DENSITY (C); Y, M, C, YM-Y, YM-M, YC-Y, YC-C, MC-M, and MC-C of Color Tincture). It should be noted that the present invention is not confined to not only the above arrangement of the original image 17, the processed images 18a through 18h and the color conversion parameters 19, but also the above numbers of the processed images and the color conversion parameters.

One of the characteristic features of the present invention is that on a screen of the display device 16 there appear the processed images 18 in addition to the original image 17. Another characteristic features of the present invention is that from among the processed images 18 being displayed there can be selected any one. In FIG. 1, the processed image 18e which has been selected appears in a bold frame for preferred selection of the processed image. Furthermore, the color conversion parameter being currently set (or gamma in FIG. 1) is displayed in white on a colored background to ensure a preferred setting operation of the color conversion parameter.

Figure 2:
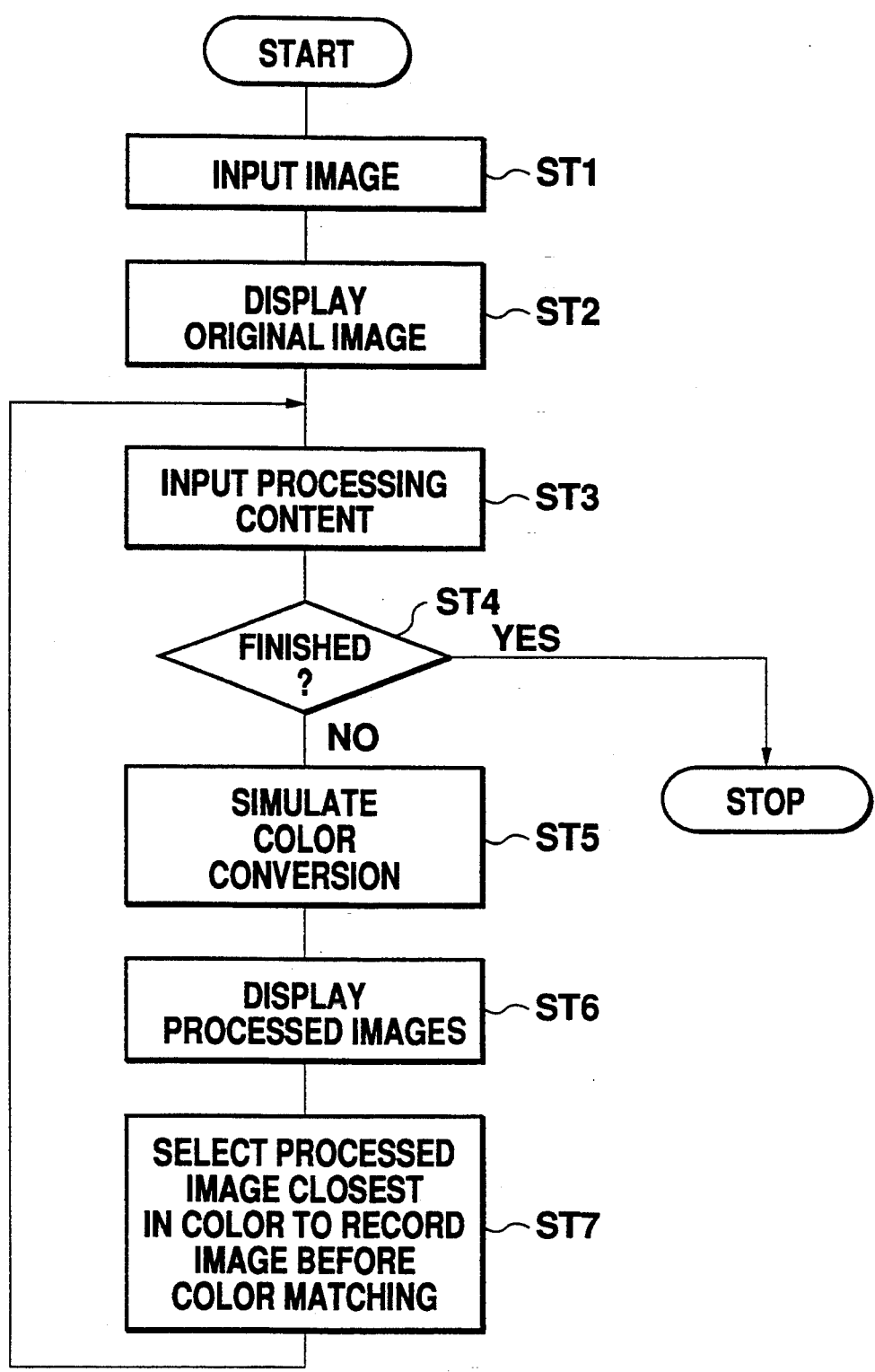
FIG. 2 is a flowchart representing a sequence of the simulation program in this embodiment.
Figure 3:
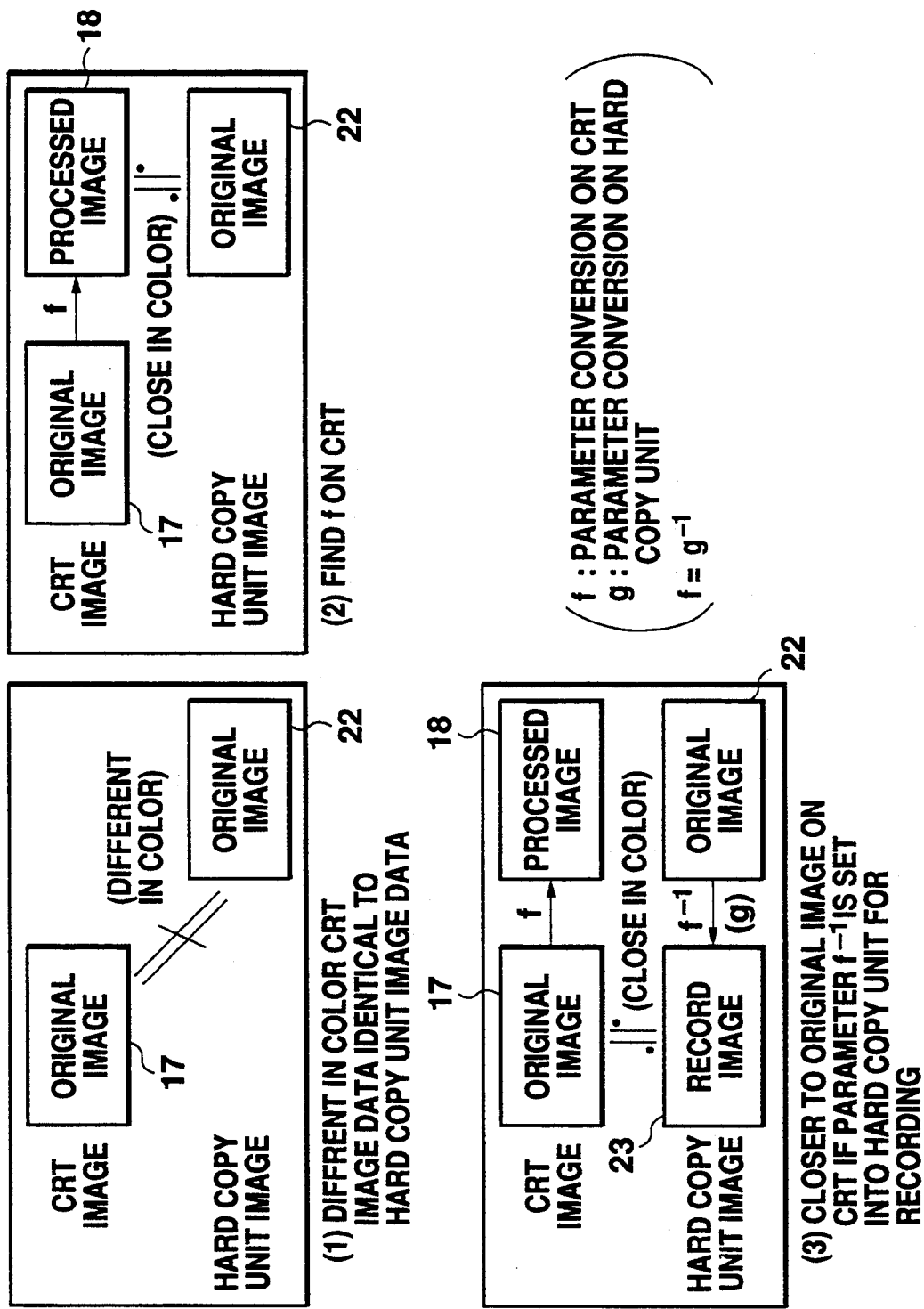
FIG. 3 shows procedures for color matching in this embodiment.

Referring next to FIGS. 2 and 3, description will be made of the operation and the usage of the apparatus shown in FIG. 1.

FIG. 2 is a flowchart of a simulation program stored in the memory 13. For the execution of this program, the CPU 14 reads image data representing the original image from the memory 13 or the external memory 21 (ST1), supplies the image data by way of the output circuit 15 to the display device 16 for displaying of the original image 17 on the screen of the display device 16, and simultaneously to the hard copy unit 20 for printing of the original image (ST2).

Thus obtained image, namely an output of the hard copy unit 20 differs in color from the original image 17 displayed on the screen of the display device 16. That is, as is clear from FIG. 3 (1), the original image 17 displayed on the screen of the display device 16 in accordance with the image data which have been read by the CPU 14 1s different in color from the printed image (hereinafter, referred to as original image 22) of the hard copy unit 20 derived from the same image data. This difference in color arises from the fact that the way of representing color in the display device 16 such as a CRT is fundamentally different from that In the hard copy unit 20 such as a printer, as described earlier.

Afterwards, the CPU 14 receives a processing content by way of the input section 10 (ST3). When the user instructs the CPU 14 to end the process through the input section 10, the CPU 14 terminates the execution of the program (ST4). When otherwise instructed, the CPU executes the subsequent Steps ST5 to ST7 to return to Step ST3.

In Step ST5, the CPU 14 simulates a color conversion. At this simulation, first of all, the user selects any one from among a plurality of color conversion functions. For this selection, there Is performed, e.g., a command input through the keyboard 8 or a menu selection through the mouse When a color conversion function is selected, the CPU 14 sets a color conversion parameter required to execute the color conversion function in accordance with an input value of the corresponding color conversion parameter so as to differ among the processed images 18a through 18h to be displayed. In this case, the value of the color conversion parameter is input into the CPU 14 through a down-load from the host computer 1 or through an operation of the input section 10. The values of the color conversion parameters corresponding to the processed images 18a through 18h to be displayed are preferably set in a stepwise manner.

The CPU 14 allows the display device 16 to display on its screen the processed images 18a through 18h each subjected to color conversion processing depending on the color conversion parameters differing from one another (ST6). The processed images 18a through 18h present different colors from one another on the screen because they have undergone their respective color conversion processing based on the different color conversion parameters. In particular, providing the values of the color conversion parameters are stepwisely set, the colors also stepwisely differ from one another, which may facilitate the selection in Step ST7 as described hereinbelow.

The user compares the original image 22 printed in the Step ST2 with the processed images 18a through 18h being displayed. As a result of this comparison, if a processed image 18 Is thought to be relatively close in color to the original image 22, then It can be said that the color conversion f (refer to FIG. 3 (2)) which has been executed to obtain the processed image 18 is substantially equal to a color conversion which would be executed when the image data associated with the original image 17 are supplied to the hard copy unit 20 as they are for the recording, in other words, a color conversion having an inverse characteristic to that of the color conversion of the hard copy unit 20.

The user which has found the processed image 18 having substantially the same color as that of the original image 22 operates the input station 10 to select the above processed image 18 (ST7). The CPU 14 causes thus selected processed image (or 18e in FIG. 1) to be displayed in a bold outer frame. After the selection, the user inputs "end" as the processing content (ST3) to terminate the execution of the simulation program.

The color conversion parameter which has been obtained at the time of executing such simulation program is a parameter for the execution of the color conversion f required to obtain the processed image 18 selected by the user. As described above, this color conversion f is the color conversion having an inverse characteristic to that of the color conversion of the hard copy unit 20. Accordingly, when the image data read out from the memory 13 are subjected to a color conversion $g=f^{-1}$ and the obtained values are recorded by the hard copy unit 20, a record image 23 is obtained whose color is substantially the same as that of the original image 17 being displayed on the screen of the display device 16 as shown in FIG. 3(3). At the time of recording described above, the user instructs a print by means of the input section 10. In response to the instrucion, the CPU 14 supplies image data read from the memory 13 to the hard copy unit 20, and sets a color conversion parameter associated with the color conversion g into the hard copy unit 20.

According to the present invention, only one trial is thus performed to obtain the original image 22 by the hard copy unit 20, thereby presenting the printed image 23 having a desired color (or the color which has been confirmed on the screen of the display device 16).

In the case of presence of the plurality of color conversion parameters as in the above embodiment, the processes of the Steps ST3 to ST7 are preferably executed for each of the color conversion parameters. For example, the CPU carries out a simulation with respect to gamma (ST5), and allows the display device 16 to display the processed images 18a to 18h each having a stepwisely different gamma value (ST6). The user selects a processed image 18 (for example, 18e in FIG. 1) closest to the original image 22 with respect to gamma (ST7). After the gamma values of the other processed images 18 have been modified into the values identical to the gamma value (1, 0 in FIG. 1) of the processed image 18 (for example, 18e in FIG. 1) selected by the user, the same processes and operations are repeated with respect to the subsequent color conversion parameter (for example, CONT). This ensures relatively simple operations associated with the simulation regardless of the plurality of color conversion parameters. In this case, the color conversion parameter being currently in operation may be displayed in white on a colored background for easier view of the screen of the display device 16 as depicted in FIG. 1.

It is to be appreciated that the color conversion parameters 19 which appear on the screen of the display 16 may comprise a color conversion parameter f used to obtain the processed image 18, or alternatively a color conversion parameter $g=f^{-1}$ used for the hard copy thereof.

What is claimed is:

1. A color image printing apparatus having a display device for displaying images; and a hard copy unit for printing the images through a manner of representing colors which is different from that of said display device, said color image recording apparatus comprising;
    a means for inputting image data representing an original image;
    a means for causing said display device to display an original image in accordance with said image data to be input;
    a means for causing said hard copy unit to print said original image in accordance with said image data;
    a means for subjecting said image data to color conversions by way of color conversion parameters each having a different value, to thereby allow said display device to display them in the form of processed images having different colors from one another;
    a means for selecting any one from among said processed images being displayed by said display device; and
    a means for causing said hard copy unit to print said original image in such a manner that said original image is subjected to an inverse color conversion to the color conversion which said selected processed image undergoes.

2. A color image reproducing apparatus according to claim 1, wherein said display device displays said original image by the side of said processed images.

3. A color image reproducing apparatus according to claim 1, wherein said display device displays in rows a plurality of processed images having different conversion parameters with one another.

4. A color image reproducing apparatus according to claim 3, further comprising a means which permits said display device to emphatically display said processed image selected by said selection means.

5. A color image reproducing apparatus according to claim 1, wherein there exist a plurality of parameters, said selection means sequentially executing the following first and second steps with respect to all of said color conversion parameters, said first step including selecting a value associated with any one of said processed images for any one of said color conversion parameters; and said second step including setting a value of said color conversion parameter being currently processed to the value selected in the first step with respect to all of said processed images.

6. A color image reproducing apparatus according to claim 5, wherein said display device displays color conversion parameters of said processed image being currently selected.

7. A color image reproducing apparatus according to claim 6, wherein said color conversion parameter being currently processed by way of said selection means is emphatically displayed by said display device.

8. A color image reproducing apparatus according to claim 1, further comprising a means of inputting values of said color conversion parameters.

9. A method of simulating a color image, comprising the steps of:

displaying and printing images by means of a display device and a hard copy unit, respectively, based on the same image data;

subjecting said image data to a color conversion process by means of color conversion parameters having different values from one another, to display a plurality of processed images by way of said display device;

setting values of said color conversion parameters in response to selecting a processed image having substantially the same color as that of the image printed by said hard copy unit from among said processed images being currently displayed; and setting in said hard copy unit a color conversion parameter representing an inverse conversion to the color conversion by way of said color conversion parameter which has been set, to thereby print an image based on said image data.

* * * * *